Patented Mar. 30, 1954

2,673,859

UNITED STATES PATENT OFFICE 2,673,859

PRODUCTION OF UREA DERIVATIVES

John Kenson Simons, Toledo, Ohio, assignor, by mesne assignments, to Allied Chemical & Dye Corporation, New York, N. Y., a corporation of New York No Drawing. Application September 15, 1950, Serial No. 185,167

13 Claims. (Cl. 260—347.3)

The invention relates to an improved method of producing urea derivatives.

U. S. Patent No. 2,477,872 discloses a method of producing urea derivatives in which urea is reacted with a ketone (or aldehyde) and hydrogen in the presence of a hydrogenation catalyst. However, it has been found that the yield of a urea derivative produced by this method is relatively low when a ketone is used, and that when an aldehyde is used, the method is very unsatisfactory, in many cases producing no product at all.

The principal object of the invention is to provide a novel method by which urea derivatives can be produced in excellent yields from aldehydes and in improved yields from ketones. More specific objects and advantages are apparent from the description, which illustrates and discloses but is not intended to limit the invention.

In accordance with the present invention urea derivatives are produced in excellent yields from aldehydes and in improved yields from ketones by reacting the aldehyde or ketone with urea or an alkylurea and hydrogen in the presence of ammonia as well as a hydrogenation catalyst.

As shown hereinafter, excellent yields of urea derivatives are produced from aldehyde by the present reaction, which is carried out in the presence of ammonia, whereas the yields are negligible if the ammonia is omitted. That the yield of 1,3-diisopropylurea obtained in accordance with Example 1 of U. S. Patent No. 2,477,872 can be approximately doubled by carrying out the reaction in the presence of ammonia in accordance with the present invention has been demonstrated as follows:

A mixture of acetone (87 grams), urea (9 grams), a solvent (20 grams of water) and a Raney nickel catalyst (7.5 grams) was placed in an Aminco rocking bomb at room temperature. (The Aminco rocking bomb used was the Aminco Micro series reaction vessel, which consists of a stainless steel cylindrical cup having an inside diameter of 1½ inches, an outside diameter of 2⅞ inches, and an inside depth of 10½ inches, fitted with a pressure head that is held against the top of the cup by bolts and is sealed with a lead or copper gasket. The pressure head contains a threaded opening for connecting a high pressure valve leading to a pressure gauge or vent. The wall of the cup contains a thermowell that is drilled upward from the bottom. The assembled reaction vessel is positioned horizontally in an electrical heating jacket and is rocked by a motor-driven mechanism through an arc of about 30 degrees at a rate of 58 cycles per minute.) The bomb was sealed and connected to a hydrogen tank. Hydrogen was admitted into the bomb until the pressure was approximately 950 pounds per square inch gauge, and the bomb was then heated, using a constant energy input, at about 150 to 153 degrees C. for one and one-half hours. The bomb was then cooled to room temperature, and the contents were poured out and filtered to remove the catalyst. The filtrate was evaporated to dryness on a steam bath, and the resulting solid material (13 grams) was then dissolved in a small quantity of hot ethanol. Upon cooling the hot ethanol solution, a crystalline solid (8.3 grams) separated from the solution. The crude crystalline material was filtered from the ethanol solution and was purified by recrystallization from water to obtain 1,3-diisopropylurea (4.4 grams), M. P. 190 to 192 degrees C.

Upon evaporation of the ethanol filtrate to dryness on a steam bath, urea (0.05 gram) sublimed and a crude solid material was obtained. The crude solid was extracted with boiling benzene (200 cc.). The hot benzene extract was cooled, iced, and filtered. The benzene filtrate was heated to boiling and used again to extract the crude solid material. The procedure was repeated until the solid was extracted four times. The material insoluble in the hot benzene (0.5 gram) was believed to be urea. The solids obtained on cooling and filtering the four benzene extractions were combined and dissolved in the aqueous filtrate (heated to boiling) remaining from the recrystallization of the first portion of 1,3-diisopropylurea. Upon cooling and filtering the aqueous solution, an additional portion of 1,3-diisopropylurea (0.3 grams), was obtained. Evaporation to dryness of the aqueous filtrate yielded sublimed urea (1 gram). A tarry solid residue remained which was believed to contain isopropyl urea (1.3 grams).

A mixture of acetone (87 grams), urea (9 grams), a solvent (20 grams of water) and a Raney nickel catalyst (7.5 grams) was reacted under hydrogen pressure by the procedure described above, except that ammonia gas (5.7 grams) was dissolved in the water solvent (cooled in an ice bath) before the solvent was added to the bomb, and the temperature during the reaction ranged between 150 and 160 degrees C. The cooled product was filtered from the catalyst and the filtrate was evaporated to dryness on a steam bath. Crystallization of the residual solid material (14 grams) from ethanol yielded 1,3-diisopropylurea (7.7 grams). Upon evaporation to dryness of the ethanol filtrate, urea (0.05 gram) sublimed and a crude solid material was obtained. The crude solid was extracted four times with boiling benzene (one 200 cc. portion). The material insoluble in hot benzene comprised isopropylurea (0.2 gram), M. P. 154 degrees C. The solids obtained on cooling and filtering the benzene extractions were combined and recrystallized from water to obtain additional diisopropylurea (1.4 grams). Upon evaporation to dryness of the aqueous filtrate, isopropylurea (3 grams) sublimed and a tarry solid residue (1 gram) remained.

Thus, it was demonstrated that the presence of ammonia in carrying out the reaction of a ketone with urea and hydrogen in the presence of a hydrogenation catalyst effects a remarkable increase in the yield of urea derivatives.

In the present method a urea derivative is produced by reacting (1) a carbonyl compound whose molecule consists of carbon, hydrogen and oxygen atoms, and contains a carbonyl radical in which the carbon atom is acyclic and is connected to the oxygen atom of the carbonyl group and to two other atoms consisting of at least one carbon atom and not more than one hydrogen atom, (2) a urea in which any substituent consists of a single alkyl group, and (3) hydrogen, in the presence of (4) a hydrogenation catalyst and (5) ammonia.

CARBONYL COMPOUND

A carbonyl compound (1) may be (a) an aldehyde having the general formula

or (b) a ketone having the general formula

wherein R, R₁, and R₂ may be the same or different and each may be of the class consisting of straight or branched chain monovalent aliphatic hydrocarbon radicals having saturated or unsaturated

bonds, and having from 1 to 20 carbon atoms (i. e., primary, secondary or tertiary alkyl radicals such as methyl, ethyl, propyl, isopropyl, 1-butyl, isobutyl, secondary butyl and tertiary butyl radicals, primary, secondary and tertiary alkyl radicals having from 5 to 20 carbon atoms, and alkylene radicals having from 2 to 20 carbon atoms); aromatic radicals having from one to two benzene nuclei containing from 6 to 12 carbon atoms (e. g., radicals of the benzene, naphthalene, and diphenyl series), having not more than 5 side chains consisting of alkyl or alkoxy radicals having from 1 to 20 carbon atoms, the total number of carbon atoms in the side chains being not more than 25, and having not more than five nuclear hydroxy radicals; aralkyl radicals each consisting of a monovalent aliphatic radical (as hereinbefore described) in which one hydrogen atom has been replaced by an aromatic radical (as hereinbefore described); and the furyl radical.

For the sake of brevity, the term "carbonyl compound" is used herein to refer to a substance of the class consisting of aldehydes, as defined in (a) above, and ketones, as defined in (b) above. Carbonyl compounds which may be employed in the present method include: acetaldehyde, propionaldehyde, butyraldehyde, furfural, α-ethyl-caproaldehyde, mesityl oxide, benzaldehyde, 1-naphthaldehyde, cinnamaldehyde, salicylaldehyde, p-tolualdehyde, o-phenylbenzaldehyde, vanillin, acetone, 2-butanone, acetophenone, acetonaphthone, benzophenone, 1-naphthyl phenyl ketone, 4-methyl-2-pentanone, 1 - phenyl - 2-propanone, 1,3 - diphenyl-2-propanone, furyl methyl ketone and 1-(2-furyl)-1-butanone.

The preferred ketones for use in the present method are those in which the carbonyl radical is attached to two monovalent hydrocarbon radicals having a total of not more than seven carbon atoms (e. g., such ketones include acetone, 2-butanone, acetophenone and 4-methyl-2-pentanone).

It is preferred that the carbonyl compound employed in the present method be aldehyde, as hereinbefore defined. Furfural, propionaldehyde, butyraldehyde and α-ethyl-caproaldehyde are particularly useful starting materials in the present method.

UREA REACTANT

The alkyl substituent in an alkylurea used in the present method may be a primary, secondary or tertiary alkyl radical having from 1 to 20 carbon atoms, as hereinbefore described. For example, alkyl-substituted ureas which may be used in the present method include: methylurea, butylurea, sec.-butylurea, tert.-butylurea, α-ethyl, hexylurea, propylurea, ethylurea, isopropylurea, N-methylisobutylcarinyl urea, tert.-amylurea, heptylurea, octylurea, nonylurea, and stearylurea. Although it is ordinarily preferred that the urea employed in the present method be unsubstituted, butylurea is a particularly important urea reactant since it may be used in the production of a new compound of the invention, 1-butyl-3-furfurylurea, which is highly useful as at plasticizer.

Thus a particularly important embodiment of the present method is the reaction of (1) furfural, (2) butylurea and (3) hydrogen in the presence of (4) a hydrogenation catalyst and (5) ammonia.

The urea derivatives obtained by the reaction of urea or an alkylurea with a carbonyl compound by the present method include both mono- and di-substituted ureas. The relative amounts of mono- and di-substitution depend upon the relative proportion of the carbonyl compound to the urea. For example, when it is desired that the predominant proportion of the product be mono-substituted, the molar ratio of the carbonyl compound to the urea may be as low as 0.6:1, but ordinarily it is preferable that it be about 1:1. In general, even with a molar ratio of 1:1, an appreciable proportion of the product may be di-substituted. The relative proportion of di-substituted product may be increased by increasing the molar ratio of the carbonyl compound to the urea above 1:1, although it is usually preferable that it be not higher than 2:1 when it is desired that the product be predominantly di-substituted. Although a higher per cent conversion to the di-substituted product based on the carbonyl compound (i. e., mol per cent of product based on the mols of carbonyl compound originally charged to the reactor) may be obtained when the molar ratio of carbonyl compound to urea used is higher than 2:1, e. g. 3:1, the actual yield based on carbonyl compound consumed may be low since during the present reaction, the excess carbonyl compound may be reduced to the corresponding alcohol. Of course, if like urea, the carbonyl compound is an inexpensive starting material, so that recovery and recycling of the carbonyl compound is not economical, the conversion may be of greater importance than the yield. In any event, the molar proportion of carbonyl compound to urea employed in the present method may be varied within approximately the above limits to give the maximum amount of the desired product most inexpensively.

HYDROGENATION CATALYST

The hydrogenation catalyst employed may be any substance which is known to catalyze hydrogenation of organic compounds under high pressure (i. e., any substance that is a member of the group of materials known as "hydrogenation catalysts"). Such substances include: finely-divided metals such as finely divided nickel, cobalt, chromium, copper or thallium, as well as the noble metals (e. g., silver, gold, platinum and palladium), and compounds comprising any of such metals in admixture or alloyed with one or more metals which act as catalysts (e. g., nickel-copper, nickel-zinc, silver-copper, copper-chromium, copper-zinc, and nickel - cobalt). Other catalysts which may be advantageously employed include the oxides of these and other metals such as tungsten, molybdenum, cerium, thorium and zirconium, and mixtures of such oxides with one another and/or with one or more metals, as well as the sulfides of such metals and mixtures of such sulfides, with one another and/or with one or more metal oxides or metals.

It is preferred that the catalyst used be a nickel catalyst, and it has been found that a catalyst prepared from Raney nickel-aluminum alloy by any known procedure may be used most advantageously in the present method. The amount of catalyst used may vary with the activity of the specific catalyst and the properties of the reactants employed. A Raney nickel catalyst is ordinarily effective in amounts as small as about 2.5 per cent of the organic reactants in the reaction mixture, but preferably the amount of such a hydrogenation catalyst employed is about 5 per cent of the organic reactants. Ordinarily it is not practical to use a Raney nickel catalyst in an amount more than about 45 per cent of the organic reactants, and usually it is preferable that the amount of such a hydrogenation catalyst used be not more than about 30 per cent of the organic reactants. The terms "per cent" and "parts" are used herein to mean per cent and parts by weight unless otherwise specified.

REACTION

The present method may be carried out by heating and agitating (in accordance with the usual procedure for catalytic hydrogenation under high pressure) a urea or an alkylurea in admixture with a carbonyl compound (as hereinbefore described) and hydrogen in the presence of a hydrogenation catalyst and ammonia.

In the practice of the present invention, the organic reactants, the hydrogenation catalyst and the ammonia may be charged severally or in admixture to the reaction vessel. It is particularly desirable to charge also a solvent for the organic reactants, primarily to facilitate the addition of the reactants to the reaction vessel. Such a solvent may be any substance which acts effectively as a mutual solvent for the urea and the carbonyl compound and which is inert (i. e., does not react with either of these organic reactants or with hydrogen) under the reaction conditions. Suitable solvents include: water, dioxane and aliphatic monohydric alcohols which boil at temperatures below about 120 degrees C. such as methyl, ethyl, propyl, isopropyl, butyl, secondary butyl, isobutyl and tertiary butyl alcohols. (In separating the reaction products from the reaction mixture it may be difficult to remove higher boiling solvents without danger of some decomposition of unreacted starting materials and/or reaction products.) Aromatic hydrocarbons such as benzene, toluene, etc. may also be present in the reaction mixture as diluents but are not ordinarily effective as solvents for the organic reactants. The proportion of solvent used varies with the specific solvent and the properties of the reactants employed. In general, the minimum proportion of solvent is that which can effect solution of at least about 10 per cent by weight of each organic reactant, and the maximum amount is that above which additional amounts of solvent do not substantially increase the ease of handling the reactants and may interfere with the efficiency of the reaction. Furthermore, large amounts of solvent should be avoided since the solvent ordinarily is removed from the product by distillation. In some cases the products obtained by the present method may be soluble in the mutual solvent for the organic reactants and frequently in such cases, the products are more soluble than the urea starting material. Thus the solvent aids also in the removal of the reaction mixture from the reactor at the completion of the reaction.

Although ammonia in its gaseous form may be pumped into the reactor, it is usually preferable to add liquid ammonia (e. g., from a Thermos bottle) to the Dry-Ice-cooled reaction mixture, not only to avoid excess pressure contributed by ammonia gas, but also to facilitate introduction of a known proportion of ammonia. It is usually even more convenient to dissolve the ammonia in an ice-cooled solvent such as water, or an alcohol, as hereinbefore described. Thus a mutual solvent used for the organic reactants also may act as a solvent for the ammonia required in the present method, thus making the addition of the ammonia to the reactor much more convenient. Ordinarily, the ammonia should be used in an amount at least equivalent to the number of mols of carbonyl compound and preferably the proportion of ammonia is at least two mols per mol of carbonyl compound. Usually it is impractical to employ more than about 5 mols of ammonia per mol of carbonyl compound, and preferably not more than 3 mols of ammonia are used for each mol of carbonyl compound.

Any reaction vessel of the type ordinarily used for catalytic hydrogenation under high pressure (i. e., a reactor equipped with suitable means for agitation and having leak-free connection and a sufficient amount of free space) may be employed in the present method. The reactor, containing the organic reactants, catalyst and ammonia (and, preferably, a solvent) is sealed and connected to a hydrogen source and hydrogen is admitted until the desired initial hydrogen pressure is obtained. The reactor is then heated at a reasonably rapid rate to reaction temperature. (Usually the heating is effected by constant energy input, but a constant heating rate may be employed if desired.) When the reaction is substantially complete (i. e., no further hydrogen absorption takes place), the reactor is cooled to room temperature, the product (usually a liquid) is filtered from the catalyst, and any solvent used, is removed by distillation. The residue remaining after removal of solvent usually solidifies, and the desired product is isolated and purified by any of various methods, depending on the properties of the product.

Although the present reaction may be conducted using only the amount of hydrogen that would theoretically be required to obtain the desired product, a much more efficient reaction takes place in the presence of an excess of hydrogen. In general, it is impractical to conduct a hydrogenation reaction such as that by which urea derivatives are obtained by the present method under ordinary pressure. Ordinarily hydrogen is admitted to the reactor until the initial hydrogen pressure at room temperature is at least about 800 pounds per square inch gauge and not higher than about 2700 pounds per square inch gauge. Usually it is preferable that the initial hydrogen pressure be at least about 1000 pounds per square inch gauge and that it be not higher than about 2000 pounds per square inch gauge.

The reaction may be effected at temperatures as low as 80 degrees C., but usually it is preferable that the reaction temperature be at least 125 degrees C. Although the reaction temperature may be as high as 250 degrees C., it is preferable that it be below 180 degrees C., and it is most desirable that it be below 150 degrees C.

Ordinarily the reaction is conducted until no more hydrogen is absorbed, as evidenced by no further drop in the pressure at reaction temperature. The reaction is usually substantially complete within one-half to six hours, depending, of course, upon the reaction conditions employed and the properties of the reactants.

The following examples illustrate the practice of the invention.

Example 1

A mixture of urea (120 grams), propionaldehyde (116 grams), a solvent (200 grams of ethanol) and a Raney nickel catalyst (15 grams) is placed in an Aminco rocking bomb designated as a 4⅜ inch series reaction vessel (which is the same as the micro series bomb except that the thermowell extends through the pressure head and the dimensions of the stainless steel cylindrical cup are as follows: inside diameter, 3 5/16 inches; outside diameter 4⅜ inches; inside depth 21 inches), and the bomb is cooled in a Dry Ice acetone bath. Liquid ammonia (50 grams) is poured from a thermos bottle into the cooled mixture. The bomb is then sealed, placed in the electrical heating jacket and rocking apparatus and connected to a hydrogen tank. Hydrogen is admitted into the bomb until the pressure is 1500 pounds per square inch gauge at room temperature. The bomb is then heated to 130 degrees C. and is held at temperatures ranging from 130 to 175 degrees C. for five and one-half hours. After cooling the bomb to room temperature, the contents are poured out and filtered to remove the catalyst. The filtrate is then distilled under reduced pressure to remove the ethanol solvent. At the start of the distillation a white solid (ammonium carbamate) appears in the condenser. The residue remaining in the flask after removal of the solvent (200 grams) solidifies on cooling to room temperature. A sample of the solid residue (40 grams) is placed in a Soxhlet apparatus and extracted with diethyl ether until the solid loses no more weight. The ether insoluble material (8 grams) is urea. Upon cooling and filtering the solution of ether-soluble material, a crystalline solid (32 grams), M. P. 93 to 96 degrees C. is obtained. This material comprises propylurea.

Example 2

(a) A mixture of urea (90 grams), butyraldehyde (72 grams), a solvent (200 grams of ethanol), a Raney nickel catalyst (10 grams) and liquid ammonia (25 grams), under an initial hydrogen pressure at room temperature of 1450 pounds per square inch gauge is heated, using the procedure and apparatus described in Example 1, except that the bomb is held at temperatures ranging from 127 to 150 degrees C. for six hours. The bomb is cooled to room temperature, the contents are poured out and filtered to remove the catalyst, and the filtrate is distilled under reduced pressure to remove the ethanol solvent. The residue remaining in the flask (136 grams) solidifies upon cooling to room temperature. A sample of the solid residue (13.6 grams) is placed in a Soxhlet apparatus and extracted with diethyl ether until the solid loses no more weight. The ether insoluble material (5.5 grams) is urea. The ether extract is evaporated to dryness, and the residue is dissolved in a very small quantity of 2-butanone. Upon cooling the solution in an ice bath, crystalline butylurea (3.2 grams, M. P. 82–83 degrees C.) separates and is recovered by filtration.

(b) The procedure described in the preceding paragraph is repeated except that the amount of urea used is 60 grams, no ammonia is charged, the initial hydrogen pressure at room temperature is 1600 pounds per square inch gauge and the bomb is heated at temperatures ranging from 122 to 135 degrees C. for five hours. The bomb is then cooled to room temperature, the contents are poured out and filtered from the catalyst, and the filtrate is distilled under reduced pressure to remove the ethanol solvent. A solid material is filtered from the residue and the filtrate is vacuum-distilled to dryness. The solid residues contain urea (42 grams), but no butylurea is detected.

Example 3

(a) A mixture of urea (120 grams), α-ethylcaproaldehyde (256 grams), ethanol (200 grams) a Raney nickel catalyst (15 grams) and liquid ammonia (50 grams), under an initial hydrogen pressure at room temperature of 1400 pounds per square inch gauge, is heated using the procedure and apparatus described in Example 1, except that the bomb is held at temperatures ranging from 160 to 178 degrees C. for seven hours. The bomb is cooled to room temperature, the product is filtered from the catalyst, and the filtrate is distilled under reduced pressure to remove the ethanol. The residue remaining after removal of the solvent (355 grams) solidifies upon standing at room temperature. A sample of the solid residue (75 grams) is steam distilled to remove unreacted α-ethyl-caproaldehyde. An immiscible oil which floats on the hot water in the still is then decanted and extracted in a separatory funnel with boiling water (three 4-liter portions).

Upon cooling the hot water solution remaining in the still and the three additional aqueous extracts, a crystalline product precipitates and is recovered from each solution by filtration. The product (32 grams) is α-ethyl-hexylurea M. P. 77 to 79 degrees C.

(b) The procedure described in the preceding paragraph is repeated except that the apparatus used is the Aminco Micro series rocking bomb; the following ingredients are charged to the bomb; urea (18 grams), α-ethyl-caproaldehyde (38.4 grams), ethanol (30 grams), a Raney nickel catalyst (7.5 grams) and liquid ammonia (5.1 grams); the initial hydrogen pressure at room temperature is 1020 pounds per square inch gauge; and the bomb is held at temperatures ranging from 150 to 180 degrees C. for two hours. The immiscible oil which floats on the water in the still after the steam distillation to remove unreacted α-ethyl-caproaldehyde is decanted and extracted in a separatory funnel three times with boiling water. Upon combining and cooling the hot water solution remaining in the still and the three aqueous extracts, α-ethyl-hexylurea precipitates and is obtained by filtration. The filtrate is evaporated on a steam bath to about half of its volume, cooled and filtered to obtain additional α-ethyl-hexylurea. Upon completely evaporating this filtrate at room temperature, a solid residue is recovered (3.5 grams) which is urea. The oily layer remaining after the last aqueous extraction solidifies on cooling. The solid is extracted with boiling water, the extract is cooled, iced, and filtered, and the filtrate is used again for extraction. This procedure is repeated three times, after the last of which no change in weight of the solidified oil is observed. The final aqueous extract is evaporated completely leaving a residue which comprise α-ethyl-hexylurea. The total recovery of pure α-ethyl-hexylurea is 18.6 grams.

(c) The procedure described in (b) is repeated except that no ammonia is used. Only 3.6 grams of α-ethyl-hexylurea is obtained. This material is recovered from the hot water solution remaining in the still after the steam distillation to remove unreacted α-ethyl-caproaldehyde, and as a slushy solid which is filtered from the immiscible oil decanted from the water solution in the still. No further recovery of α-ethyl-hexylurea is obtained by extraction of the oil with hot water, nor does the oil solidify on cooling.

*Example 4*

A mixture of urea (120 grams), benzaldehyde (212 grams), a solvent (200 grams of ethanol), a Raney nickel catalyst (15 grams) and liquid ammonia (50 grams), under an initial hydrogen pressure at room temperature of 1100 pounds per square inch gauge, is heated using the procedure and apparatus described in Example 1, except that the bomb is held at temperatures ranging from 130 to 150 degrees C. for seven and one-quarter hours. The bomb is then cooled to room temperature, and the reaction mixture is poured out and filtered to separate a considerable amount of solid material which is present in the mixture. The solid material is stirred with hot ethanol, and the portion which remains undissolved, consisting of the catalyst, is filtered from the solution. The solution is cooled and filtered to obtain a crystalline solid. The solid is recrystallized from several additional portions of hot ethanol to obtain pure dibenzylurea (26 grams), M. P. 168 to 170 degrees C. The ethanolic mother liquors from the recrystallizations are combined with the alcoholic filtrate from the mixture originally removed from the bomb and the resulting solution is evaporated to dryness on a steam bath. Recrystallization of the residual solid from hot water yields pure benzylurea (122 grams), M. P. 146 to 147 degrees C.

*Example 5*

A mixture of urea (120 grams), 2-butanone (142 grams), a solvent (200 grams of ethanol), a Raney nickel catalyst (15 grams), and liquid ammonia (50 grams), under an initial hydrogen pressure at room temperature of 1050 pounds per square inch gauge, is heated using the procedure and apparatus described in Example 1, except that the bomb is held at temperatures ranging from 150 to 183 degrees C. for five hours and ten minutes. The bomb is cooled to room temperature, the product is removed and filtered from the catalyst, and the ethanol solvent is distilled under reduced pressure from the filtrate. The residue remaining after removal of the solvent solidifies upon standing at room temperature. Upon boiling the solid residue in water, an insoluble oily layer separates from the water solution. The water solution is siphoned out and cooled to precipitate a crystalline solid which is purified by recrystallization from water. The pure crystalline material (56 grams) is sec.-butylurea, M. P. 165 to 166 degrees C. The oily layer (28 grams) which partially solidifies upon cooling is believed to comprise 1,3-di-sec.-butylurea.

*Example 6*

A mixture of urea (120 grams), 2-butanone (177 grams), a solvent (150 grams of ethanol), a Raney nickel catalyst (12 grams), and liquid ammonia (40 grams), under an initial hydrogen pressure at room temperature of 1000 pounds per square inch gauge, is heated using the procedure and apparatus described in Example 1, except that the bomb is held at 162 to 178 degrees C. for two and one-half hours. The bomb is cooled to room temperature, the product is removed and filtered from the catalyst, and the ethanol solvent is distilled under reduced pressure from the filtrate. The residue remaining after removal of the solvent solidifies upon standing at room temperature. The solid residue is extracted with several large portions of hot water. Upon combining and cooling the hot water extracts, a crystalline product separates. Recrystallization of the product from hot water yields pure dl-α-phenylethylurea (75 grams) M. P. 136 to 137 degrees C.

Upon cooling the hot water-soluble materials, an oily layer containing a crystalline solid separates. The solid (40 grams), which is believed to comprise 1,3-bis(dl-α-phenylethyl)urea, is recovered by filtration from the oily layer.

*Example 7*

(a) A mixture of urea (3 mols), furfural (2 mols), a solvent (200 grams of ethanol), a Raney nickel catalyst (15 grams), and liquid ammonia (50 grams), under an initial hydrogen pressure at room temperature of 1450 pounds per square inch gauge, is heated using the procedure and apparatus described in Example 1, except that the bomb is held at temperatures ranging from 136 to 145 degrees C. for seven hours. The bomb is cooled to room temperature, the product is removed and filtered from the catalyst, and the solvent is distilled from the filtrate. The residue remaining after removal of the solvent solidifies upon standing at room temperature. The solid residue is mixed with hot water (170 grams) and 5 grams of "Darco" (a commercial decolorizing agent), and the mixture is filtered. The filtrate contains an immiscible oil which floats on the hot water solution. The clear liquid is decanted from the oil. Upon cooling the oil, a solid crystalline material is formed. Recrystallization of the solid material from 2-butanone yields pure 1,3-difurfurylurea (22 grams) M. P. 124-127 degrees C. which is recovered by filtration from the 2-butanone solution. The hot water solution decanted from the oil is cooled to precipitate a crystalline solid (furfurylurea) which is obtained by filtration. The filtrate is combined with the 2-butanone filtrate, and the mixture is evaporated on a steam bath to small volume. The residue is crystallized from water to obtain additional pure furfuryl urea, M. P. 100 to 102 degrees C., the total yield of this product being 145 grams.

(b) When the procedure described in the preceding paragraph is repeated except that the proportion of urea charged to the bomb is 2.5 mols; the initial hydrogen pressure at room temperature is 1800 pounds per square inch gauge; and the bomb is held for six and one-quarter hours at temperatures ranging from 124 to 219 degrees C.; furfurylurea (105 grams) and 1,3-difurfurylurea (30 grams, crystallized from methanol instead of 2-butanone) are obtained.

(c) When the procedure described in (a) above is repeated except that the proportion of urea charged to the bomb is 2 mols; the initial hydrogen pressure at room temperature is 1250 pounds per square inch gauge; and the bomb is held for five and one-quarter hours, at temperatures ranging from 130 to 172 degrees C.; furfurylurea (90 grams) and 1,3-difurfurylurea (28 grams) (crystallized from methanol) are obtained.

(d) When the procedure described in (c) is repeated except that the initial hydrogen pressure at room temperature is 1200 pounds per square inch gauge and the bomb is held at temperatures ranging from 130 to 136 degrees C. for six hours and forty minutes, furfurylurea (95 grams) and 1,3-difurfurylurea (27 grams) are obtained.

(e) When the procedure described in (a) above is repeated except that the proportion of urea charged to the bomb is 1 mol; the initial hydrogen pressure at room temperature is 1400 pounds per square inch gauge; and the bomb is held for seven hours at temperatures ranging from 130 to 140 degrees C.; furfurylurea (50 grams) and 1,3-difurfurylurea (99 grams) are obtained.

As the results obtained in runs (a) through (e) above indicate, the proportion of dialkylurea increases with an increase in the molar proportion of carbonyl compound to urea. Even when a 1:1 molar ratio of furfural to urea is used as described in (c) and (d) above, a considerable proportion of 1,3-difurfurylurea is obtained.

*Example 8*

Ammonia gas (5.1 grams) is dissolved in an ice-cooled solvent (71 grams of methanol). The resulting solution and 4-methyl-2-pentanone (30 grams), urea (18 grams), and a Raney nickel catalyst (7.5 grams) are charged to the bomb described in Example 3 (b). The bomb is then sealed, placed in the electrical heating jacket and rocking apparatus and connected to a hydrogen tank. Hydrogen is admitted to the bomb until the pressure at room temperature is approximately 1000 pounds per square inch gauge. The bomb is then heated at 150 degrees C. for about two hours. The bomb is cooled to room temperature, and the product is removed and filtered from the catalyst. The filtrate is steam distilled to remove the methanol solvent, unreacted 4-methyl-2-pentanone, and 4-methyl-2-pentanol. Upon cooling, the residue crystallizes to a white solid. Recrystallization of the solid from water yields pure N-methylisobutylcarbinylurea (6.9 grams), M. P. 142 to 143 degrees C.

*Example 9*

A mixture of urea (18 grams), butyraldehyde (21.6 grams), a Raney nickel catalyst (7.5 grams) and ammonia gas (5.1 grams dissolved in 71 grams of ice-cooled methanol), under an initial hydrogen pressure of approximately 1000 pounds per square inch gauge at room temperature, is heated using the procedure and apparatus described in Example 8. After cooling the bomb to room temperature, the product is filtered from the catalyst, and the methanol solvent is distilled from the filtrate. A solid separates from the residue remaining after removal of the solvent, upon standing at room temperature. The solid, which is recovered by filtration, is butylurea (0.7 gram). The syrupy filtrate is mixed with a small portion of diethyl ether, and the mixture is filtered, using suction. The diethyl ether-soluble portion is extracted with water in a separatory funnel. The diethyl ether is evaporated from the ether layer on a steam bath, leaving a semi-liquid residue (13 grams) which is believed to consist mainly of 1,3-dibutylurea.

(b) When the procedure described in (a) is repeated except that no ammonia is used, the solid which separates from the residue remaining after removal of the solvent is urea (4.5 grams). The syrupy filtrate is mixed with a small amount of diethyl ether, and insoluble solid (1 gram) is filtered from the mixture and the filtrate is evaporated on a steam bath to remove the diethyl ether. The solid residue (0.5 gram), M. P. 90-110 degrees C., is believed to comprise butylurea.

*Example 10*

A urea derivative embodying the invention, 1-butyl-3-furfurylurea, may be prepared by the following procedure: A mixture of butylurea (40.5 grams), furfural (67 grams), a solvent (40 cc. of ethanol), a Raney nickel catalyst (15 grams), and liquid ammonia (15 grams), under an initial hydrogen pressure at room temperature of 1300 pounds per square inch gauge, is heated to a temperature of 173 degrees C. using the procedure and apparatus described in Example 3 (b), except that as soon as the temperature reaches 173 degrees C. the pressure drops rapidly to 150 pounds per square inch gauge and more hydrogen is added to raise the pressure to 1000 pounds per square inch gauge. The heating is continued at 173 degrees C. until the pressure remains constant at 700 pounds per square inch gauge. The bomb is cooled to room temperature, the product is removed and filtered from the catalyst, and the ethanol solvent is distilled under reduced pressure from the filtrate. The syrupy residue remaining after the distillation solidifies upon standing at room temperature. The solid residue (35 grams) is dissolved in a hot mixture of ethyl alcohol and water, the solution is cooled, and a precipitated solid is filtered off. The solid is recrystallized from hot water to obtain glistening crystals of pure 1-butyl-3-furfurylurea, M. P. 87–90 degrees C.

Having described the invention, I claim:

1. A method of producing urea derivatives that comprises reacting at a temperature not greater than 250° C. (1) a carbonyl compound of the class consisting of aldehydes and ketones whose molecules consist of carbon, hydrogen and oxygen atoms, (2) a substance of the class consisting of urea and monoalkylureas and (3) hydrogen, in the presence of (4) a hydrogenation catalyst and (5) at least one mol of ammonia for each mol of the carbonyl compound.

2. A method as claimed in claim 1 wherein the carbonyl compound is an aldehyde.

3. A method as claimed in claim 1 wherein the substance (2) is urea.

4. A method of producing urea derivatives that comprises reacting at a temperature not greater than 250° C. (1) an aldehyde whose molecule consists of carbon, hydrogen and oxygen atoms, (2) urea, and (3) hydrogen, in the presence of (4) a hydrogenation catalyst and (5) at least one mol of ammonia for each mol of the carbonyl compound.

5. A method as claimed in claim 4 wherein the hydrogenation catalyst is a nickel catalyst.

6. A method as claimed in claim 4 wherein the hydrogenation catalyst is a Raney nickel catalyst.

7. 1-butyl-3-furfurylurea.

8. A method of producing urea derivatives that comprises reacting at a temperature not greater than 250° C. (1) furfural, (2) urea, and (3) hydrogen, in the presence of (4) a hydrogenation catalyst and (5) at least one mol of ammonia for each mol of the carbonyl compound.

9. A method of producing urea derivatives that comprises reacting at a temperature not greater than 250° C. (1) furfural, (2) butylurea, and (3) hydrogen, in the presence of (4) a hydrogenation catalyst and (5) at least one mol of ammonia for each mol of the carbonyl compound.

10. A method of producing urea derivatives that comprises reacting at a temperature not greater than 250° C. (1) propionaldehyde, (2) urea, and (3) hydrogen, in the presence of (4) a hydrogenation catalyst and (5) at least one mol of ammonia for each mol of the carbonyl compound.

11. A method of producing urea derivatives that comprises reacting at a temperature not greater than 250° C. (1) butyraldehyde, (2) urea, and (3) hydrogen in the presence of (4) a hydrogenation catalyst and (5) at least one mol of ammonia for each mol of the carbonyl compound.

12. A method of producing urea derivatives that comprises reacting at a temperature not greater than 250° C. (1) α-ethyl-caproaldehyde, (2) urea, and (3) hydrogen, in the presence of (4) a hydrogenation catalyst and (5) at least one mol of ammonia for each mol of the carbonyl compound.

13. A method of producing urea derivatives that comprises reacting at a temperature not greater than 250° C. (1) a ketone in which the carbonyl radical is attached to two monovalent hydrocarbon radicals having a total of not more than seven carbon atoms, (2) urea, and (3) hydrogen, in the presence of (4) a hydrogenation catalyst and (5) at least one mol of ammonia for each mol of the carbonyl compound.

JOHN KENSON SIMONS.

References Cited in the file of this patent

UNITED STATES PATENTS

| Number | Name | Date |
| --- | --- | --- |
| 2,477,872 | Haury | Aug. 2, 1949 |

OTHER REFERENCES

Chemical Process Industries (Shreve), p. 756, 1945, McGraw-Hill Book Co., Inc., New York.